US010356681B2

(12) United States Patent
Emmanuel et al.

(10) Patent No.: US 10,356,681 B2
(45) Date of Patent: Jul. 16, 2019

(54) CLIENT ROAMING IN A DISTRIBUTED MULTI-BAND WIRELESS NETWORKING SYSTEM

(71) Applicant: NETGEAR, INC., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 202 days.

(21) Appl. No.: 15/453,850

(22) Filed: Mar. 8, 2017

(65) Prior Publication Data

US 2018/0084471 A1 Mar. 22, 2018

Related U.S. Application Data

(63) Continuation-in-part of application No. 15/287,706, filed on Oct. 6, 2016, and a continuation-in-part of application No. 15/287,711, filed on Oct. 6, 2016, and a continuation-in-part of application No. 15/271,912, filed on Sep. 21, 2016, now Pat. No. 9,967,884.

(Continued)

(51) Int. Cl.
*H04W 36/30* (2009.01)
*H04W 36/08* (2009.01)
*H04W 36/38* (2009.01)
*H04W 4/02* (2018.01)
*H04W 24/06* (2009.01)
*H04W 24/08* (2009.01)
*H04W 76/15* (2018.01)
*H04W 36/00* (2009.01)
*H04W 84/12* (2009.01)
*H04W 24/04* (2009.01)
*H04W 76/10* (2018.01)

(52) U.S. Cl.
CPC .......... *H04W 36/30* (2013.01); *H04W 4/023* (2013.01); *H04W 24/06* (2013.01); *H04W 24/08* (2013.01); *H04W 36/0083* (2013.01); *H04W 36/08* (2013.01); *H04W 36/38* (2013.01); *H04W 76/15* (2018.02); *H04W 24/04* (2013.01); *H04W 76/10* (2018.02); *H04W 84/12* (2013.01)

(58) Field of Classification Search
CPC ..... H04W 36/30; H04W 36/08; H04W 36/38; H04W 84/12
USPC ......................................................... 370/332
See application file for complete search history.

(56) References Cited

U.S. PATENT DOCUMENTS 7,155,167 B1  12/2006  Carty
7,502,354 B1   3/2009  Maufer
(Continued)

OTHER PUBLICATIONS

"WLAN High Availability", Technical white paper; Hewlett-Packard Development Company, L.P., Oct. 2014, 8 pages.

*Primary Examiner* — Faruk Hamza
*Assistant Examiner* — Jean F Voltaire
(74) *Attorney, Agent, or Firm* — Perkins Coie LLP

(57) ABSTRACT

Client roaming techniques, such as those set forth in 802.11k, are extended to access point-based client roaming in a distributed multi-band wireless networking system. In particular, access points (APs) implement a series of algorithms that compare signals and make decisions on when to switch a client from one AP to another AP in a distributed multi-band wireless networking system. The invention exploits to advantage the fact that the APs can communicate with each other via the dedicated backhaul.

14 Claims, 8 Drawing Sheets

Related U.S. Application Data

(60) Provisional application No. 62/406,325, filed on Oct. 10, 2016.

(56) References Cited

U.S. PATENT DOCUMENTS

| | | | |
|---|---|---|---|
| 7,567,822 B2 | 7/2009 | Hart et al. | |
| 8,248,948 B2 | 8/2012 | Weil et al. | |
| 9,001,767 B1 | 4/2015 | Gatewood et al. | |
| 9,179,495 B1 | 11/2015 | Scherzer et al. | |
| 9,467,929 B2 | 10/2016 | Sekine | |
| 9,832,796 B2 | 11/2017 | Mehta | |
| 9,942,709 B2 | 4/2018 | Sung | |
| 2002/0042274 A1 | 4/2002 | Ades | |
| 2005/0048963 A1 | 3/2005 | Kubler et al. | |
| 2007/0206528 A1 | 9/2007 | Walton et al. | |
| 2007/0280453 A1 | 12/2007 | Kelley et al. | |
| 2008/0025208 A1 | 1/2008 | Chan | |
| 2008/0080414 A1 | 4/2008 | Thubert et al. | |
| 2008/0247317 A1 | 10/2008 | Weil et al. | |
| 2009/0046655 A1 | 2/2009 | Zhao et al. | |
| 2009/0067369 A1 | 3/2009 | Stamoulis et al. | |
| 2009/0116407 A1 | 5/2009 | Ishii | |
| 2009/0135738 A1 | 5/2009 | Mhatre et al. | |
| 2009/0135794 A1 | 5/2009 | Su et al. | |
| 2009/0221238 A1 | 9/2009 | Ko et al. | |
| 2009/0252127 A1 | 10/2009 | Rangarajan et al. | |
| 2010/0118830 A1 | 5/2010 | Stephenson et al. | |
| 2010/0157888 A1 | 6/2010 | Aggarwal et al. | |
| 2010/0231473 A1 | 9/2010 | Shtrom et al. | |
| 2010/0246416 A1 | 9/2010 | Sinha et al. | |
| 2010/0260146 A1 | 10/2010 | Lu | |
| 2010/0291931 A1 | 11/2010 | Suemitsu et al. | |
| 2011/0081903 A1 | 4/2011 | Cai et al. | |
| 2011/0250926 A1 | 10/2011 | Wietfeldt et al. | |
| 2011/0286404 A1 | 11/2011 | Abraham et al. | |
| 2011/0299422 A1 | 12/2011 | Kim et al. | |
| 2012/0020319 A1 | 1/2012 | Song et al. | |
| 2012/0129517 A1 | 5/2012 | Fox et al. | |
| 2012/0224481 A1* | 9/2012 | Babiarz | H04L 43/0876 370/230.1 |
| 2012/0224484 A1 | 9/2012 | Babiarz et al. | |
| 2012/0225646 A1 | 9/2012 | Mochida et al. | |
| 2012/0294200 A1 | 11/2012 | Wang et al. | |
| 2013/0194948 A1 | 8/2013 | Mallik et al. | |
| 2014/0233412 A1 | 8/2014 | Mishra et al. | |
| 2014/0254400 A1 | 9/2014 | Zhou et al. | |
| 2014/0270306 A1 | 9/2014 | Luna et al. | |
| 2015/0018028 A1* | 1/2015 | Uplenchwar | H04W 52/143 455/522 |
| 2015/0029067 A1 | 1/2015 | Donaldson et al. | |
| 2015/0049616 A1 | 2/2015 | Cowan et al. | |
| 2015/0092681 A1 | 4/2015 | Fernando et al. | |
| 2015/0103685 A1 | 4/2015 | Butchko et al. | |
| 2015/0215791 A1 | 7/2015 | Geller et al. | |
| 2015/0264614 A1 | 9/2015 | Stager et al. | |
| 2015/0334750 A1 | 11/2015 | Mehta | |
| 2016/0007273 A1 | 1/2016 | Pang et al. | |
| 2016/0029384 A1 | 1/2016 | Sidhu et al. | |
| 2016/0066249 A1 | 3/2016 | Dukes et al. | |
| 2016/0094946 A1 | 3/2016 | Keithley | |
| 2016/0142163 A1 | 5/2016 | Sirotkin | |
| 2016/0192203 A1 | 6/2016 | Gokturk et al. | |
| 2016/0212755 A1 | 7/2016 | Cao et al. | |
| 2016/0227544 A1 | 8/2016 | Katar et al. | |
| 2016/0269097 A1 | 9/2016 | Islam et al. | |
| 2016/0286374 A1 | 9/2016 | Patil et al. | |
| 2016/0308755 A1 | 10/2016 | Garg | |
| 2016/0366632 A1 | 12/2016 | Cui et al. | |
| 2017/0006431 A1 | 1/2017 | Donovan et al. | |
| 2017/0048913 A1 | 2/2017 | Teyeb et al. | |
| 2017/0070919 A1 | 3/2017 | Chandok et al. | |
| 2017/0118705 A1 | 4/2017 | Tran et al. | |
| 2017/0125920 A1 | 5/2017 | Spiel et al. | |
| 2017/0127295 A1 | 5/2017 | Black et al. | |
| 2017/0127325 A1 | 5/2017 | Vikberg et al. | |
| 2017/0164260 A1 | 6/2017 | Shi et al. | |
| 2017/0164323 A1* | 6/2017 | Markhovsky | H04W 64/006 |
| 2017/0215091 A1 | 7/2017 | Ling | |
| 2017/0238189 A1 | 8/2017 | Nolan et al. | |
| 2017/0251410 A1 | 8/2017 | Comstock | |
| 2017/0251429 A1* | 8/2017 | Kapoor | H04W 48/20 |
| 2017/0325243 A1 | 11/2017 | Yasukawa et al. | |

* cited by examiner

CLIENT ROAMING IN A DISTRIBUTED MULTI-BAND WIRELESS NETWORKING SYSTEM

CROSS REFERENCE TO RELATED APPLICATIONS

This application claims priority to U.S. provisional patent application Ser. No. 62/406,325, filed Oct. 10, 2016, and is a continuation-in-part of U.S. patent application Ser. No. 15/287,706, filed Oct. 6, 2016; Ser. No. 15/287,711, filed Oct. 6, 2016; and Ser. No. 15/271,912, filed Sep. 21, 2016, each of which application is incorporated herein in its entirety by this reference thereto.

FIELD

The invention relates to a distributed multi-band wireless networking system. More particularly, the invention relates to client roaming in a distributed multi-band wireless networking system.

BACKGROUND

In an indoor environment, such as a large house or an office, a single access point (AP) often may not be able to cover the entire indoor area.

One straightforward attempt to solve this problem is to increase the transmission power. However, solely relying on increasing the transmission power on the AP would be a poor solution. In addition to regulatory bodies that limit the transmission power of the AP, it is typical that the wireless local area network (WLAN) communications link between an AP and a client is highly asymmetrical, that is, the client's transmission power is usually lower than the AP's transmission power. The client's antenna efficiency conventionally is also lower than the AP. Moreover, a portable client, e.g. a mobile phone, often is hand held by a user, and because of the signal absorption and disruption by the human body, signals from such portable client may reach the AP at even lower powers. Yet, many commonly used WLAN protocols require each side of the link to receive an acknowledgement (ACK) for the packets that are transmitted, e.g. in a downlink direction. If one side of the WLAN link cannot receive from the other side of the link, no packet can be transmitted to the other side of the link.

Instead of one AP with high transmission power and high performance antennas, an attractive alternative is using a multitude of smaller APs that are deployed in the environment in a scattered, distributed manner. These smaller APs form a wireless mesh network, and therefore are also called mesh points. When a client device establishes connection with one of the mesh points, the mesh points can forward the traffic to the mesh point that is connected to the gateway, which in turn communicates the traffic to the outside world, e.g. wide area network (WAN) and/or the Internet. However, there are also many challenges associated with implementing these wireless mesh networks, especially in a home environment where a layman user may be involved in installing and configuring these mesh points.

Generally speaking, as mentioned above, a better alternative to an access point (AP) with large transmission power is a wireless mesh network with a multitude of smaller APs, deployed in the environment in a scattered, distributed manner. These smaller APs (or mesh points) are often marketed as so-called "range extenders" or "repeaters." A range extender generally works by associating itself to a user's main AP and receiving Internet connection from the main AP. Then, clients such as mobile phones, laptops, and desktop computers, and smart devices can associate to the range extender.

In many of these settings, it is up to the connection client to decide what happens, e.g. what action or reaction to take when a certain type of issues takes place, such as poor reception, in the wireless mesh network, which may adversely affect the efficiency and stability of such network. For example, roaming between the main AP and repeater can be a common issue where the clients may be stuck in a connection with the main AP or a repeater mesh point and may not roam to the mesh point that can provide the clients with the best throughput. All too often, roaming between multiple range extenders and the main AP may not function as designed, and different roaming methods may be required for different types of clients.

IEEE 802.11, commonly referred to as Wi-Fi, is widely used for wireless communications. Many deployed implementations have effective ranges of only a few hundred meters. To maintain communications, devices in motion that use it must handoff from one access point to another.

Handoffs are already supported under the preexisting standard. The fundamental architecture for handoffs is identical for 802.11 with and without 802.11r, i.e. the mobile device is entirely in charge of deciding when to hand off and to which access point it wishes to hand off.

The key negotiation protocol in 802.11i specifies that, for 802.1X-based authentication, the client is required to renegotiate its key with the RADIUS or other authentication server supporting Extensible Authentication Protocol (EAP) on every handoff. This is a time-consuming process.

The 802.11 Working Group standards k, r, and v let clients roam more seamlessly from AP to AP within the same network. IEEE 802.11k and 802.11r are industry standards that enable seamless Basic Service Set (BSS) transitions in the WLAN environment. The 802.11k standard provides information to discover the best available access point.

The 802.11k standard helps a device to speed up its search for nearby APs that are available as roaming targets by creating an optimized list of channels. When the signal strength of the current AP weakens, the device scans for target APs from this list.

802.11k is intended to improve the way traffic is distributed within a network. In a wireless LAN, each device normally connects to the AP that provides the strongest signal. Depending on the number and geographic locations of the subscribers, this arrangement can sometimes lead to excessive demand on one AP and under-utilization of others, resulting in degradation of overall network performance. In a network conforming to 802.11k, if the AP having the strongest signal is loaded to its full capacity, a wireless device is connected to one of the underutilized APs. Even though the signal may be weaker, the overall throughput is greater because more efficient use is made of the network resources.

In 802.11k, the following steps are performed before switching to a new access point: the access point determines that a client is moving away from it, the access point informs the client that it should prepare to switch to a new access point, the client requests a list of nearby access points, the access point provides a site report to the client, the client moves to best access point based on the report.

In 802.11k, therefore, roaming from AP to AP is client-centric.

SUMMARY

Embodiments of the invention herein extend roaming techniques, for example but not by way of limitation, such as those set forth in 802.11k, to AP-based client roaming in a distributed multi-band wireless networking system. In particular, embodiments of the invention provide a series of algorithms for comparing signals and making decisions at the AP on when to switch a client from one AP to another AP in a distributed multi-band wireless networking system. The invention exploits to advantage the fact that the APs can communicate with each other via the dedicated backhaul.

DRAWINGS

DESCRIPTION

Figure 1:
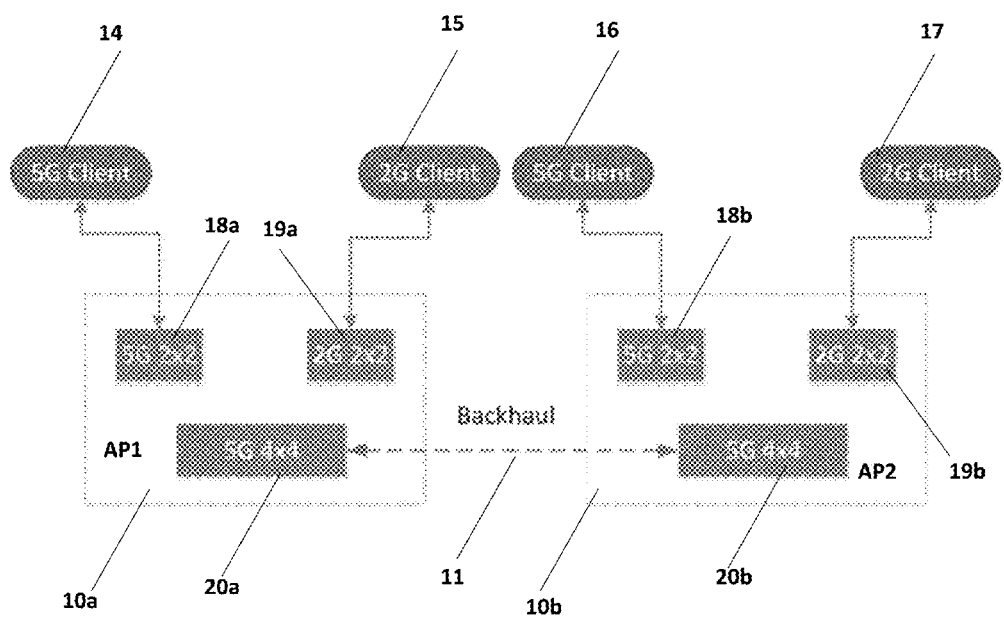
FIG. 1 is a block schematic diagram showing a backhaul link established between two mesh points in the mesh network according to the invention.

Embodiments of the invention exploit to advantage a multi-band, e.g. tri-band, wireless networking system. In some embodiments, the multi-band wireless networking system includes multiple wireless networking devices. At least one of the wireless networking devices is connected to the Internet and serves as a router. The remaining wireless networking devices serve as satellites that are wirelessly connected to the router via a wireless channel (a band), which is dedicated to the communications between the wireless networking devices, i.e. a dedicated backhaul. Both the router and the satellites provide wireless network connections, e.g. Wi-Fi connections, to client devices, such as desktop computers, laptop computers, tablet computers, mobile phones, wearable smart devices, game consoles, smart home devices, etc. The router and the satellites together provide a single wireless network having broad coverage to the client devices. The multi-band wireless networking system dynamically optimizes the wireless connections of the client devices without the need of reconnecting. An example of the multi-band wireless networking system is the NETGEAR® Orbi® system. Such systems are exemplified in U.S. patent application Ser. No. 15/287,711, filed Oct. 6, 2016 and Ser. No. 15/271,912, filed Sep. 21, 2016, each of which application is incorporated herein in its entirety by this reference thereto.

In some embodiments, the wireless networking devices of the system include radio components for three wireless bands, such as 2.5 GHz band, 5 GHz low band, and 5 GHz high band. One of the bands can be dedicated to the wireless communications among the wireless networking devices of the system. Such wireless communications among the wireless networking devices of the system is referred to herein as backhaul communications. The other two bands can be used for wireless communications between the wireless networking devices of the system and client devices. The wireless communications between the wireless networking devices of the system and client devices are referred to herein as front haul communications.

In some embodiments, the system uses the 5 GHz high band for backhaul communications by default, and uses the 2.4 GHz band and 5 GHz low band for front haul communications. For example, when the 2.4 GHz band is used for front haul communications, each unit of the system can operate on a different channel in the 2.4 GHz band. A band can include multiple channels.

Embodiments of the invention herein extend roaming techniques, for example but not by way of limitation, such as those set forth in 802.11k, to AP-based client roaming in a distributed multi-band wireless networking system. In particular, embodiments of the invention provide a series of algorithms for comparing signals and making decisions at the AP on when to switch a client from one AP to another AP in a distributed multi-band wireless networking system. The invention exploits to advantage the fact that the APs can communicate with each other via the dedicated backhaul.

FIG. 1 is a block schematic diagram showing a backhaul link established between two mesh points in the mesh network. Those skilled in the art will appreciate that the invention is readily used in any type of network configuration, e.g. mesh, star, etc. In FIG. 1, two APs 10*a*, 10*b* each include three radios 18*a*-20*a* and 18*b*-20*b*, respectively. The APs use their radios to communicate with various clients 14-17. Those skilled in the art will appreciate that the number of radios can be varied. Key to an embodiment of the invention is the use of one radio in each AP as a channel that establishes a dedicated backhaul 11. The backhaul may be used to perform such control and management functions, for example, as a controlling entity that coordinates with other APs to make a roaming decision and that instructs a client to execute a roaming decision.

Besides regular WLAN services, e.g. data packet forwarding to and from the gateway and the Internet, that are provided by the mesh network in FIG. 1 to client devices, in a number of implementations, the mesh points themselves in the mesh network can use one or more telecommunication circuits to form one or more dedicated backhaul links among the mesh points. Such backhaul links may also be used to perform control and management functions, for example, as the controlling entity that instructs a mesh point to execute a roaming decision for a client. In addition, or as an alternative, such backhaul links can be used to provide more throughput, and/or to provide fault tolerance to the mesh network, e.g. to provide redundancy against temporary interference, etc.

The decision for a best channel for each unit can be made based on various factors, such as network topology, number of interfering APs on each channel for each unit, noise on each channel for each unit, interference duration as percentage of time for each unit, type of network traffic supported for each unit, etc. Techniques to provide automated mesh point survey and guided installation for assisting the installation and configuration of a wireless mesh network are described in U.S. patent application Ser. No. 15/287,706, filed Oct. 6, 2016, which application is incorporated herein in its entirety by this reference thereto.

Such techniques include roaming, where a multiple device wireless mesh network may have a network control system, which may be centralized or distributed, and the network controller can decide, for example, with which mesh point each client should associate, when a client should roam, etc. In embodiments of the invention, roaming is implemented amongst a plurality of APs, e.g. AP1 and AP2, where each AP has three channels, i.e. three radios, that are on different channels (see FIG. 1).

Embodiments of the invention use the ability of APs to communicate via a dedicated backhaul to effect radio resource management (RRM), i.e. the system level management of co-channel interference, radio resources, and other radio transmission characteristics in wireless communication systems, for example cellular networks, wireless local area networks, and wireless sensor systems. RRM involves strategies and algorithms for controlling parameters, such as transmit power, user allocation, beamforming, data rates, handover criteria, modulation scheme, error coding scheme, etc. One objective of RRM is to use the limited radio-frequency spectrum resources and radio network infrastructure as efficiently as possible.

Figure 2:
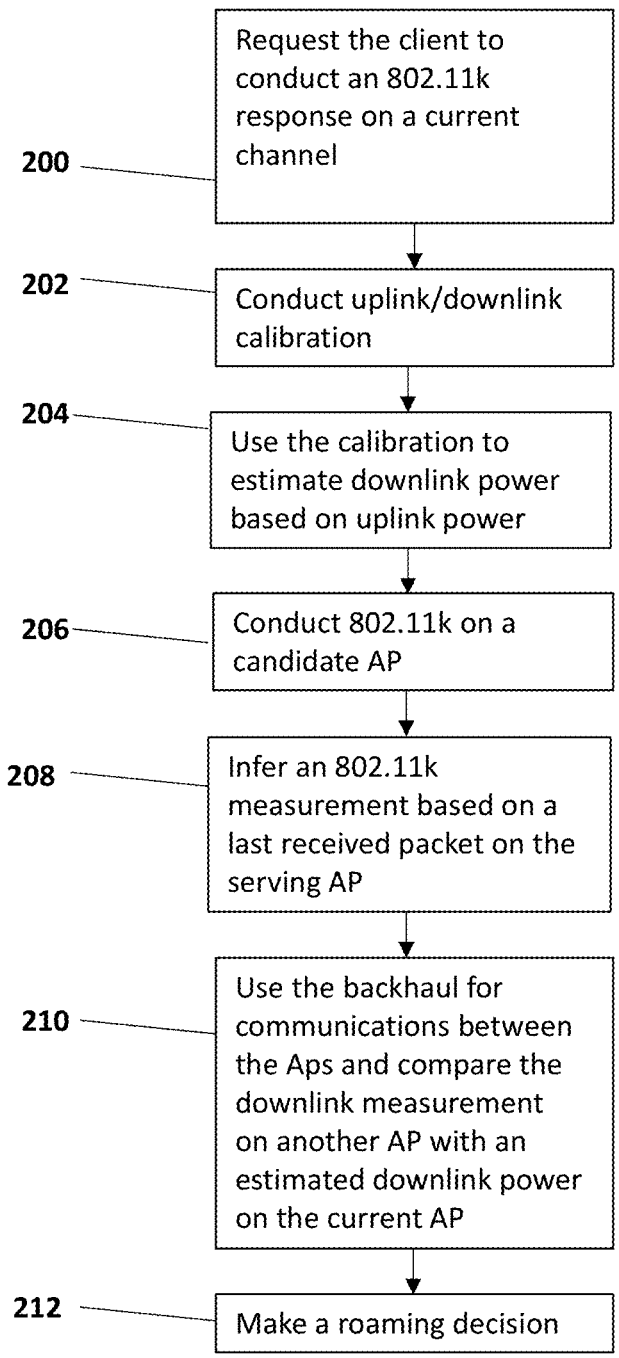
FIG. 2 is a flow diagram showing a roaming decision process according to the invention.

FIG. 2 is a flow diagram showing a roaming decision process according to the invention. With regard to embodiments of the invention, the received signal strength indicator (RSSI) in telecommunications is a measurement of the power present in a received radio signal. Embodiments of the invention conduct, e.g. an 802.11k RSSI measurement when different APs are on different channels for roaming purposes. However, many clients cannot take advantage of 802.11k, e.g. with multiple channel requests. In embodiments of the invention, an AP requests that the client conduct an 802.11k response on a current channel (200) and conduct uplink/downlink calibration (202). After that, the system uses the calibration to estimate downlink power based on uplink power (204).

In embodiments of the invention, the AP measures the receive signal strength of the packets that the client is sending every time a packet is received. The response 802.11k reports the signal strength of the AP's signal at the client side. Therefore, the delta between the signal strength of client at the AP and signal strength of AP at the client can be measured and averaged to account for fading and system inaccuracy.

The system conducts 802.11k on a candidate AP (unit) (206), and infers an 802.11k measurement based on a last received packet on the serving AP (208). In embodiments of the invention, the 802.11k measurement on the current channel can be skipped because the delta between uplink and downlink node is known. The last received packet can be used to measure the receive signal of client at the AP side and the signal strength of the client at the AP side can be inferred from that. Therefore, after 802.11k on the potential destination channel is performed, the delta between signal strength on new channel and the current channel, as seen by the client, is known.

Embodiments of the invention, using the backhaul for communications between the APs, compare the downlink measurement on another AP with an estimated downlink power on the current AP (210). Then, a decision is made whether or not the client should be instructed to roam (212).

In embodiments of the invention, the system looks at the RSSI of the client on current channel and the RSSI of the client on another channel. If the other channel has an RSSI which is better by some margin and there is enough air time on the channel that the client traffic can be serviced, then the client is moved to the new channel. The system also checks the client traffic type and makes sure the Quality of Service can be met on the target channel.

Figure 3:
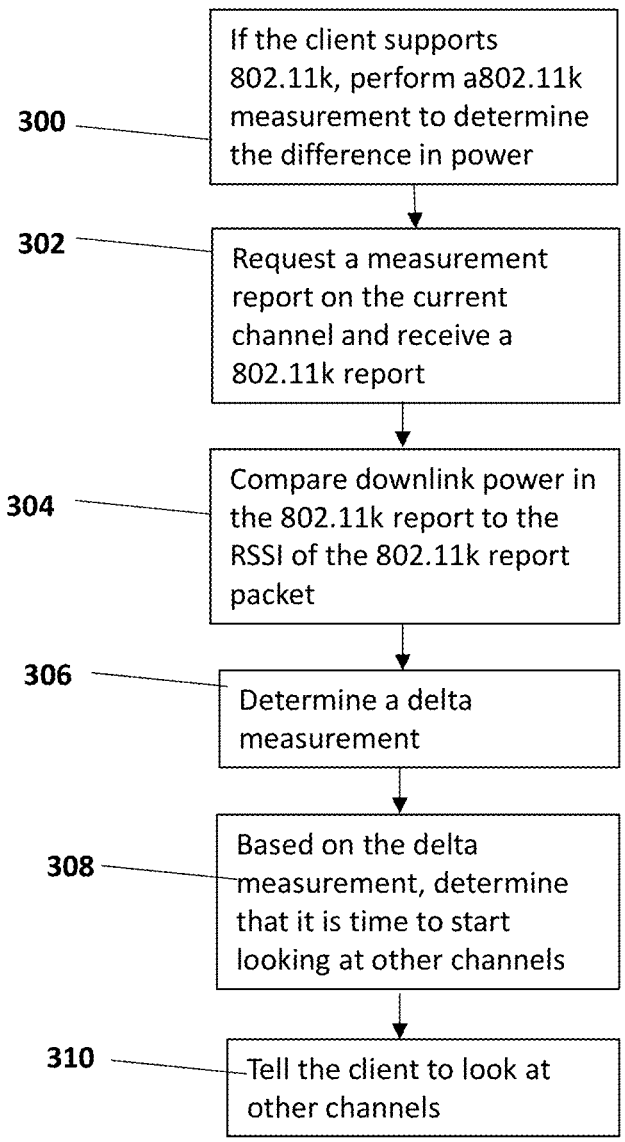
FIG. 3 is a flow diagram showing the use of a calibration procedure as part of a roaming decision process according to the invention.

Embodiments of the invention conduct uplink/downlink calibration using 802.11k, as noted above. FIG. 3 is a flow diagram showing the use of a calibration procedure as part of a roaming decision process according to the invention. When a client supports 802.11k, the system performs the 802.11k measurement to determine the difference in power (300). Later, the system can use the information and does not need to ask for an 802.11k measurement on the serving AP if other APs are on other channels. The system asks for a measurement report on the current channel and receives the 802.11k report (302). The system compares the downlink power mentioned in the 802.11k report to the RSSI of the 802.11k report packet (304) and determines a delta measurement (306). Several measurements may be made so the power difference can be averaged over multiple measurements and the measurement is therefore more accurate. When the delta measurement moves to a certain point, e.g. when the candidate channel is better than the serving channel by X dB, for example 5 dB or 10 dB, the system also checks channel loading on the candidate channel, the system determines that it is time to start looking at other channels (308), and the system then tells the client to look at other channels (310).

A key feature of the invention is that a measurement can be made at an AP using 802.11k without the need for the client to roam on the serving channel because the client does not have to see an RSSI report from the AP and the client does not have to make a roaming decision as per 802.11k. Accordingly, with regard to the invention there is almost no impact on what the client does. The client is idle and when it is idle it can receive a signal from any AP.

As outlined above, the client sends the 802.11k report to the AP indicating how well the AP signal is received at the client. The AP takes over the responsibility of determining when the client needs to roam. The AP looks at the signal from the client based on what the client tells it in the 802.11k packets that it sends back to the AP. When the client indicates that the signal is getting weaker, the AP tells the client to begin looking at other channels, e.g. find a better AP. Because the AP is in constant communication with the other APs via the dedicated backhaul, the APs can coordinate this process and make the decision for the client with regard to changing channels to access another, more robust AP vis a vis the client. The client does not have to select a new AP from a list of APs, as per 802.11k because this decision is made for it by the APs.

The system can also help with rate control. Because the difference between client link to the AP and AP link to the client is known, the system can use packets received from the client on the AP as a measure of a rate that can work on the downlink. In other words, the client AP communication link is highly asymmetric and there is difficulty in effecting rate control because it is not possible to measure an asymmetric link. Accordingly, embodiments of the invention use the 802.11k exchange to estimate the asymmetry.

Embodiments of the invention operate in monitor mode, or RFMON (Radio Frequency MONitor) mode, which allows a computer, i.e. and AP, with a wireless network interface controller (WNIC) to monitor all traffic received from the wireless network. Unlike promiscuous mode, which is also used for packet sniffing, monitor mode allows packets to be captured without having to associate with an access point or ad hoc network first.

A packet analyzer, also known as a network analyzer, protocol analyzer or packet sniffer or, for particular types of networks, an Ethernet sniffer or wireless sniffer, is a computer program or piece of computer hardware that can intercept and log traffic that passes over a digital network or part of a network. As data streams flow across the network, the sniffer captures each packet and, if needed, decodes the packet's raw data, showing the values of various fields in the packet, and analyzes its content according to the appropriate RFC or other specifications.

Figure 4:
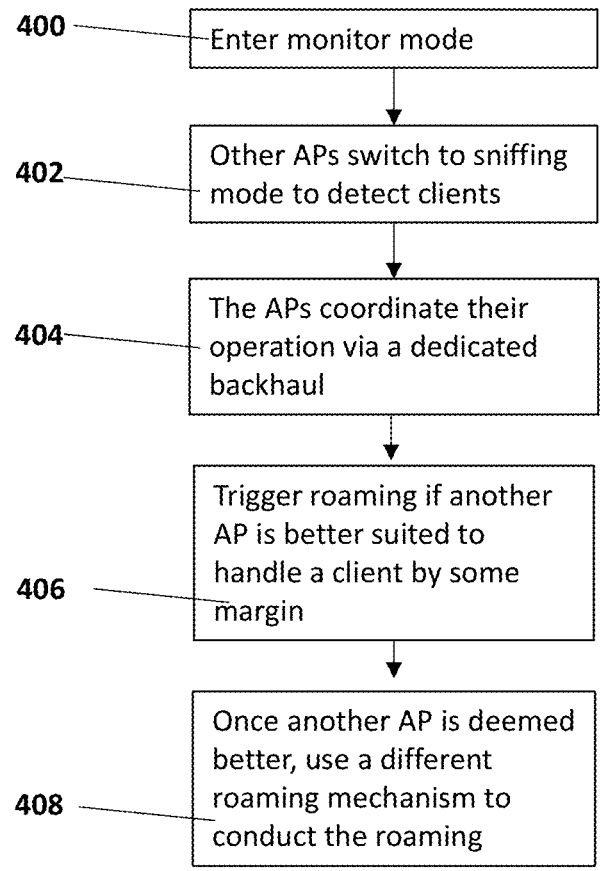
FIG. 4 is a flow diagram showing the use of monitor mode in connection with a roaming decision according to the invention.

FIG. 4 is a flow diagram showing the use of monitor mode in connection with a roaming decision according to the invention. Embodiments of the invention operate in a monitor mode for legacy clients with APs on the same channel (400). With the monitor mode, other APs can go to sniffing mode to detect clients (402). The APs coordinate their operation via the dedicated backhaul (404). A limited number of clients can be sniffed. If another AP is better suited to handle a client by some margin, roaming can be triggered (406). Once another AP is deemed better, the system can use a different roaming mechanism to conduct the roaming (408).

Embodiments of the invention send a DE-authentication packet to the client and disconnect the client on the current channel. The client then tries to look for the AP by sending the probe request. The system does not respond on the current channel, and the client then look for the AP on all other channels. The system responds on the channel to which the client is to be directed. It is only possible to use this technique with the client occasionally because the client may blacklist the AP. As such, the timing of this technique is adjusted based on the client type and what is learned from the field.

As discussed above, embodiments of the invention monitor client selection. Legacy clients with an RSSI smaller than a predetermined value X can be monitor mode candidates. Clients with which an 802.11k request fails can be candidates for roaming. Clients with which 802.11k measurements are not accurate can be used. When an 802.11k measurement has a delay that is larger than a desired level, the client may be a candidate for monitor mode. Monitor mode can be used to calibrate transmit and receive power differences.

Figure 5:
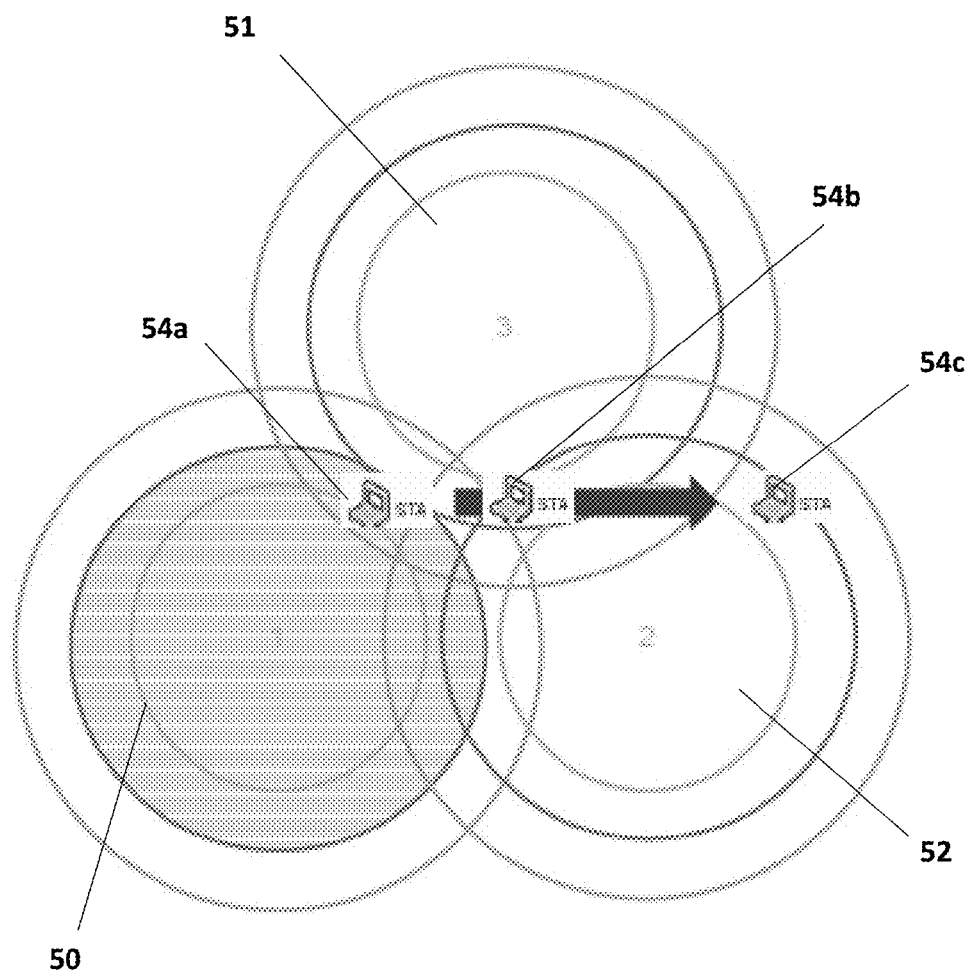
FIG. 5 is a block schematic diagram that shows that monitor mode being triggered in middle mode according to the invention.

FIG. 5 is a block schematic diagram that shows that monitor mode being triggered in middle mode according to the invention. In FIG. 5, three APs 50-52 coordinate their operation via a dedicated backhaul. Each AP produces a signal that can be received at a client. The strength of the signal with regard to the client is shown for each AP by concentric circles, where a current AP is shown having a filled circle, indicating signal strength. However, the client is moving as shown by the shifting of the client from position 54a to 54b to 54c. At position 54b, the client is in the middle of the three APs. At this point, monitor mode could be triggered to roam the client from AP 50 to another, nearer AP, such as AP 52.

The system monitor mode can use a fast channel switch. In such case, the AP must hop to another channel to make a measurement. Coordination needs to be done for the AP so it can hop to the other channel and hop back. The AP needs to make sure when it jumps to the other channel that the current client does not treat the AP as disconnected.

The AP can only move off of a channel occasionally. If it has moved off a channel recently, it may need to delay the next move by a certain interval X. The AP can also send packets reserving airtime for a transmission but not proceed with the transmission. This can be done by sending CTS2SELF packets or faking RTS/CTS.

Figure 6:
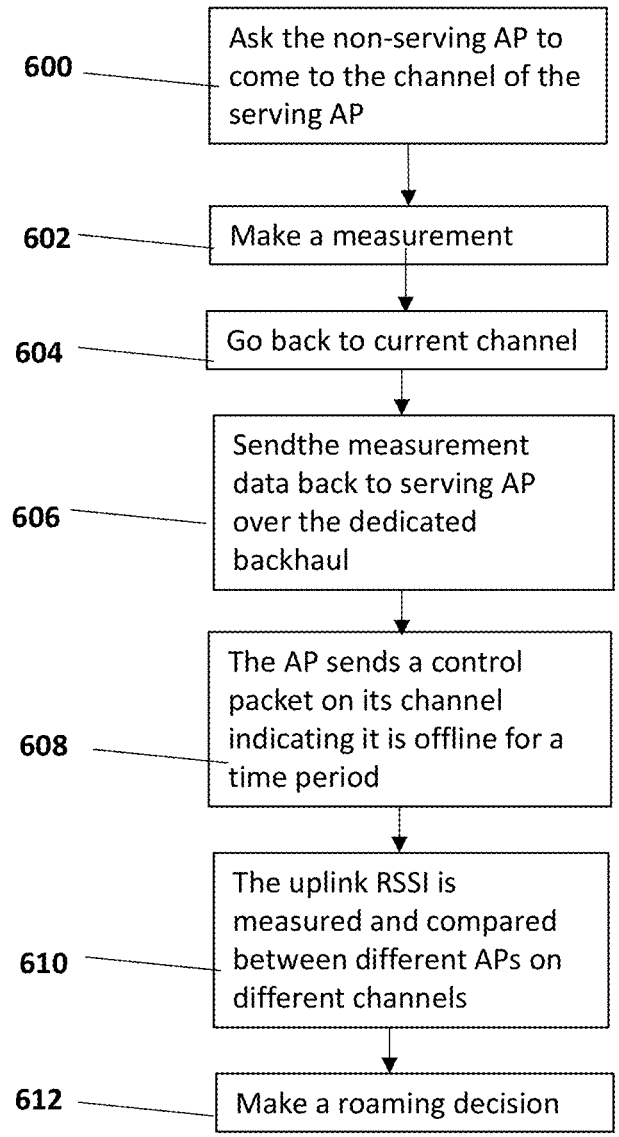
FIG. 6 is a flow diagram showing the use of monitor mode in connection with a fast channel switch according to the invention.

FIG. 6 is a flow diagram showing the use of monitor mode in connection with a fast channel switch according to the invention. The monitor mode can be on different channels. Significantly, channel switch coordination can be performed over the dedicated backhaul. The system asks the non-serving AP to come to the channel of the serving AP (600), makes a measurement (602), and then goes back to current channel (604) and sends the measurement data back to serving AP over the dedicated backhaul (606). The AP sends a control packet on its channel indicating it is offline for a time period (608). In this case, the uplink RSSI is measured and compared between different APs on different channels (610) and a roaming decision is made (612).

APs are calibrated so that RSSI measurement is more accurate than the client. In embodiments of the invention, for example, the AP can be calibrated in the production line so the signal is transmitted on different channels is consistent and very reliable. If a client operates with 802.11 it may be preferable not to use monitor mode. However, monitor mode is more accurate than 802.11k if the AP is calibrated. Embodiments of the invention determine when clients that have 802.11k should use 802.11k and when they should use monitor mode.

Some APs have limited slots to monitor clients. If the slots are limited and some clients are being monitored, then 802.11k clients may take a lower priority in using monitor mode. The AP can also determine over time if the client RSSI measurement is inaccurate by comparing multiple measurements from clients. If the client supports 802.11k and the RSSI is less accurate, then the client can get higher priority for monitor mode than an 802.11k client with more accurate measurements. Also, some clients are slow in responding to 802.11k. In such cases, monitor mode may help speed up the process, which can provide another parameter to be used in giving priority to the client.

802.11v BTM

Figure 7:
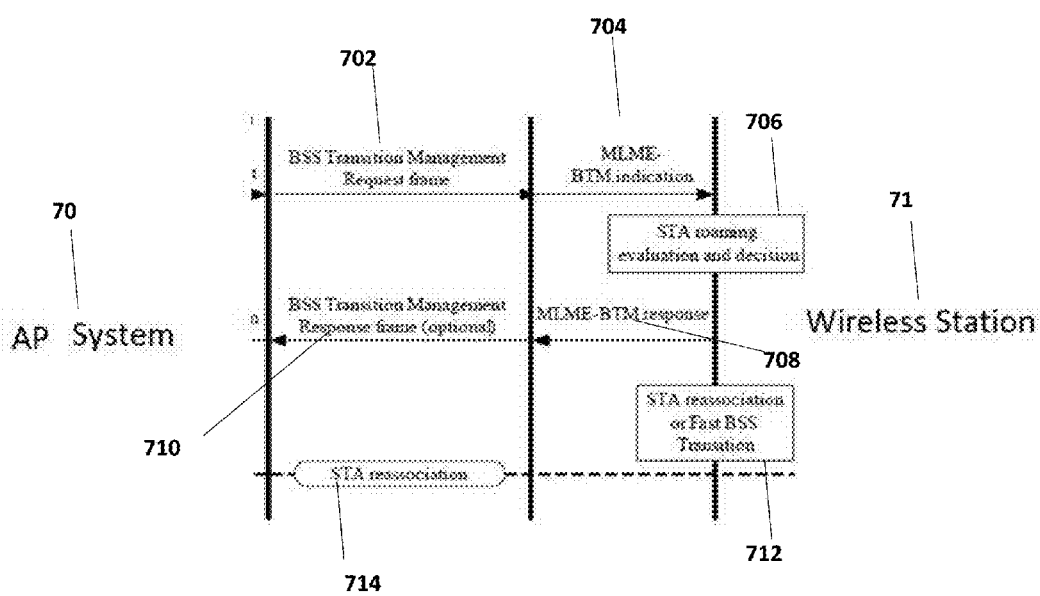
FIG. 7 is a process flow diagram showing the use of 802.11v BTM to guide a client move after an 802.11k measurement is made according to the invention.

FIG. 7 is a process flow diagram showing the use of 802.11v BSS transition management (BTM) to guide a client move after an 802.11k measurement is made according to the invention. In FIG. 7, an access point (AP) 70 communications with a client 71. With regard to BTM, the AP sends a BSS transition management request frame (702) to the client providing an MLME-BTM indication (704)/ The client engages in STA roaming evaluation and makes a decision (706) and send an MLME-BTM response (708), which optionally provides a BSS transition management response frame (710) to the AP. Thereafter, the client goes through STA reassociation or Fast BSS transition (712) and STA reassociation is complete (714).

In embodiments of the invention, BSS transition management enables an AP to request non-AP STAs to transition to a specific AP, or to indicate to a non-AP STA a set of preferred APs, due to network load balancing or BSS termination. Thus, BSS transition management allows the network's control layer to influence client roaming behavior by providing it with the load information of nearby access points. In embodiments of the invention, BTM is used to guide the client to go from one AP to another AP, if the system decides to steer the client. For 802.11k capable clients, the client management framework uses the actual beacon report generated by the client in response to a beacon report request sent by the AP. This beacon report replaces the virtual beacon report for that client. For 802.11v capable clients, the controller uses the 802.11v BSS Transition message to steer clients to the desired AP upon receiving a client steer trigger from the AP. BTM is used only when it is supported by the client.

Computer Implementation

Figure 8:
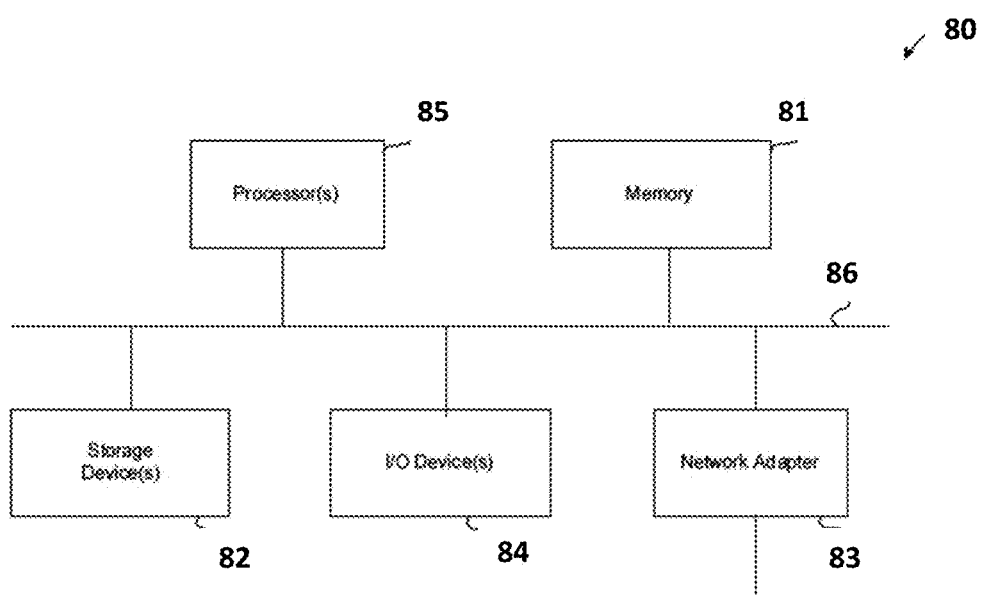
FIG. 8 is a block schematic diagram showing a machine in the example form of a computer system within which a set of instructions for causing the machine to perform one or more of the methodologies discussed herein may be executed.

FIG. 8 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 80 may include one or more central processing units ("processors") 85, memory 81, input/output devices 84, e.g. keyboard and pointing devices, touch devices, display devices, storage devices 82, e.g. disk drives, and network adapters 83, e.g. network interfaces, that are connected to an interconnect 86.

In FIG. 8, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (12C) bus, or an Institute of Electrical and Electronics Engineers (IEEE) standard 1394 bus, also referred to as Firewire.

The memory 81 and storage devices 82 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 81 can be implemented as software and/or firmware to program one or more processors to carry out the actions described above. In some embodiments of the invention, such software or firmware may be initially provided to the processing system 80 by downloading it from a remote system through the computing system, e.g. via the network adapter 83.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for effecting client roaming in a distributed multi-band wireless networking system, comprising:
    wirelessly interconnecting a plurality of wireless networking devices via a wireless channel which is dedicated for communications between said wireless networking devices;
    said interconnected wireless networking devices collectively comprising a single, multi-band wireless network providing broad coverage to said client devices; and
    said multi-band wireless network dynamically optimizing wireless connections to said client devices by comparing signals received from said client devices at said wireless networking devices and making decisions to switch a client from one wireless networking device to another wireless networking device;
    wherein said decision to switch said client is made for said client by said multi-band wireless network independently of said client;
    said decision at said wireless networking devices to switch a client from one wireless networking device to another wireless networking device further comprising:
    a first one of said wireless networking devices requesting that a client conduct an 802.11k response on a current channel;
    said first wireless networking device receiving from said client a received signal strength indicator (RSSI) measurement of the power present in a received radio signal at said client;
    said first wireless networking device conducting an uplink/downlink calibration;
    said first wireless networking device using said calibration to estimate downlink power based on uplink power;
    said first wireless networking device conducting an 802.11k response on a second, candidate wireless networking device;
    said first wireless networking device inferring an 802.11k measurement based on a last received packet on said second, candidate wireless networking device;
    said first and second wireless networking devices using said dedicated wireless channel for communications between said wireless networking devices to compare a downlink measurement on second wireless networking device with an estimated downlink power on said first wireless networking device; and
    one or both of said first and second wireless networking devices making a decision whether or not the client should be instructed to roam.

2. A method for effecting client roaming in a distributed multi-band wireless networking system, comprising:
    wirelessly interconnecting a plurality of wireless networking devices via a wireless channel which is dedicated for communications between said wireless networking devices;
    said interconnected wireless networking devices collectively comprising a single, multi-band wireless network providing broad coverage to said client devices; and
    said multi-band wireless network dynamically optimizing wireless connections to said client devices by comparing signals received from said client devices at said wireless networking devices and making decisions to switch a client from one wireless networking device to another wireless networking device;
    wherein said decision to switch said client is made for said client by said multi-band wireless network independently of said client;
    when a client supports 802.11k, a first wireless networking device performing an 802.11k measurement to determine a difference in power;

said first wireless networking device requesting a measurement report on a current channel and receiving said 802.11k report from said client indicating how well a signal from the first wireless networking device is received at the client;

said first wireless networking device comparing downlink power provided in said 802.11k report to an RSSI of an 802.11k report packet;

said first wireless networking device determining a delta measurement between downlink power provided in said 802.11k report and said RSSI of said 802.11k report packet;

said first wireless networking device determining that said client should look at other channels when said delta measurement equals or exceeds a predetermined value; and said first wireless networking device instructing said client to look at other channels.

3. A method for effecting client roaming in a distributed multi-band wireless networking system, comprising:

wirelessly interconnecting a plurality of wireless networking devices via a wireless channel which is dedicated for communications between said wireless networking devices;

said interconnected wireless networking devices collectively comprising a single, multi-band wireless network providing broad coverage to said client devices; and said multi-band wireless network dynamically optimizing wireless connections to said client devices by comparing signals received from said client devices at said wireless networking devices and making decisions to switch a client from one wireless networking device to another wireless networking device;

wherein said decision to switch said client is made for said client by said multi-band wireless network independently of said client;

said decision at said wireless networking devices to switch a client from one wireless networking device to another wireless networking device further comprising:

said multi-band wireless network operating a first one or more of said wireless network devices in a monitor mode for legacy clients with wireless network devices on a same channel;

said multi-band wireless network operating a second one or more of said wireless network devices in a sniffing mode to detect said clients;

said wireless network devices coordinating their operation with each other via said wireless channel which is dedicated for communications between said wireless networking devices;

said multi-band wireless network determining when a wireless network device other than a wireless network device currently in communication with said client is better suited to handle a client by a predetermined margin; and said multi-band wireless network triggering roaming when a wireless network device other than a wireless network device currently in communication with said client is determined better suited to handle said client.

4. The method of claim 3, wherein monitor mode candidates comprise any of the following clients:

legacy clients having an RSSI smaller than a predetermined value;

clients with which an 802.11k request fails;

clients with which 802.11k measurements are not accurate; and clients in which an 802.11k measurement has a delay that is larger than a predetermined level.

5. The method of claim 3, further comprising:
said multi-band wireless network using monitor mode to calibrate transmit and receive power differences.

6. The method of claim 3, further comprising:
said multi-band wireless network performing a fast channel switch, in which a wireless network device hops to a channel other than a channel with which it communicates with a client to make a measurement and then hops back to said channel which it communicated with said client without said client treating said wireless network device as disconnected.

7. A method for effecting client roaming in a distributed multi-band wireless networking system, comprising:

wirelessly interconnecting a plurality of wireless networking devices via a wireless channel which is dedicated for communications between said wireless networking devices;

said interconnected wireless networking devices collectively comprising a single, multi-band wireless network providing broad coverage to said client devices; and said multi-band wireless network dynamically optimizing wireless connections to said client devices by comparing signals received from said client devices at said wireless networking devices and making decisions to switch a client from one wireless networking device to another wireless networking device;

wherein said decision to switch said client is made for said client by said multi-band wireless network independently of said client;

said multi-band wireless network performing monitor mode on different channels;

said multi-band wireless network coordinating a channel switch via said wireless channel which is dedicated for communications between said wireless networking devices;

said multi-band wireless network requesting a non-serving wireless network device operating on a first channel to move to a serving wireless network device operating on a second channel;

said non-serving wireless network device making a measurement on said second channel;

said non-serving wireless network device returning to said first channel;

said non-serving wireless network device sending said measurement back to said serving wireless network device via said wireless channel which is dedicated for communications between said wireless networking devices;

said serving wireless network device sending a control packet on said second channel indicating that it is offline for a predetermined interval;

said multi-band wireless network measuring an uplink RSSI with at least two wireless network devices;

said multi-band wireless network comparing said measured RSSI between at least two wireless network devices on different channels; and said multi-band wireless network making a client roaming decision.

8. An apparatus for effecting client roaming in a distributed multi-band wireless networking system, comprising:

a plurality of wireless networking devices wirelessly interconnected via a wireless channel which is dedicated for communications between said wireless networking devices;

said interconnected wireless networking devices comprising a single, multi-band wireless network providing broad coverage to said client devices; and said multi-band wireless network comprising at least one processor that dynamically optimizes wireless connections to the client devices by comparing signals received from said client devices at said wireless networking devices and that makes decisions at said wireless networking devices to switch a client from one wireless networking device to another wireless networking device;

wherein said decision to switch said client is made by said multi-band wireless network independently of said client;

said processor making said decision at said wireless networking devices to switch a client from one wireless networking device to another wireless networking device by executing programmed steps in which:

a first one of said wireless networking devices requests that a client conduct an 802.11k response on a current channel;

wherein said first wireless networking device receives from said client a received signal strength indicator (RSSI) measurement of the power present in a received radio signal at said client;

said first wireless networking device conducts an uplink/downlink calibration;

said first wireless networking device uses said calibration to estimate downlink power based on uplink power;

said first wireless networking device conducts an 802.11k response on a second, candidate wireless networking device;

said first wireless networking device infers an 802.11k measurement based on a last received packet on said second, candidate wireless networking device;

said first and second wireless networking devices use said dedicated wireless channel for communications between said wireless networking devices to compare a downlink measurement on second wireless networking device with an estimated downlink power on said first wireless networking device; and one or both of said first and second wireless networking devices make a decision whether or not the client should be instructed to roam.

9. An apparatus for effecting client roaming in a distributed multi-band wireless networking system, comprising:

a plurality of wireless networking devices wirelessly interconnected via a wireless channel which is dedicated for communications between said wireless networking devices;

said interconnected wireless networking devices comprising a single, multi-band wireless network providing broad coverage to said client devices; and said multi-band wireless network comprising at least one processor that dynamically optimizes wireless connections to the client devices by comparing signals received from said client devices at said wireless networking devices and that makes decisions at said wireless networking devices to switch a client from one wireless networking device to another wireless networking device;

wherein said decision to switch said client is made by said multi-band wireless network independently of said client; and further comprising said processor executing programmed steps in which:

when a client supports 802.11k, a first wireless networking device performs an 802.11k measurement to determine a difference in power;

said first wireless networking device requests a measurement report on a current channel and receiving said 802.11k report from said client indicating how well a signal from the first wireless networking device is received at the client;

said first wireless networking device compares downlink power provided in said 802.11k report to an RSSI of an 802.11k report packet;

said first wireless networking device determines a delta measurement between downlink power provided in said 802.11k report and said RSSI of said 802.11k report packet;

said first wireless networking device determines that said client should look at other channels when said delta measurement equals or exceeds a predetermined value; and said first wireless networking device instructs said client to look at other channels.

10. An apparatus for effecting client roaming in a distributed multi-band wireless networking system, comprising:

a plurality of wireless networking devices wirelessly interconnected via a wireless channel which is dedicated for communications between said wireless networking devices;

said interconnected wireless networking devices comprising a single, multi-band wireless network providing broad coverage to said client devices; and said multi-band wireless network comprising at least one processor that dynamically optimizes wireless connections to the client devices by comparing signals received from said client devices at said wireless networking devices and that makes decisions at said wireless networking devices to switch a client from one wireless networking device to another wireless networking device;

wherein said decision to switch said client is made by said multi-band wireless network independently of said client;

said processor making said decision at said wireless networking devices to switch a client from one wireless networking device to another wireless networking device further comprising executing programmed steps in which:

said multi-band wireless network operates a first one or more of said wireless network devices in a monitor mode for legacy clients with wireless network devices on a same channel;

said multi-band wireless network operates a second one or more of said wireless network devices in a sniffing mode to detect said clients;

said wireless network devices coordinate their operation with each other via said wireless channel which is dedicated for communications between said wireless networking devices;

said multi-band wireless network determines when a wireless network device other than a wireless network device currently in communication with said client is better suited to handle a client by a predetermined margin; and said multi-band wireless network triggers roaming when a wireless network device other than a wireless network device currently in communication with said client is determined better suited to handle said client.

11. The apparatus of claim 10, wherein monitor mode candidates comprise any of the following clients:

legacy clients having an RSSI smaller than a predetermined value;

clients with which an 802.11k request fails;
clients with which 802.11k measurements are not accurate; and
clients in which an 802.11k measurement has a delay that is larger than a predetermined level.

12. The apparatus of claim 10, wherein said multi-band wireless network uses monitor mode to calibrate transmit and receive power differences.

13. The apparatus of claim 10, further comprising:
said processor programmed to execute steps with which said multi-band wireless network performs a fast channel switch, in which a wireless network device hops to a channel other than a channel with which it communicates with a client to make a measurement and then hops back to said channel which it communicated with said client without said client treating said wireless network device as disconnected.

14. An apparatus for effecting client roaming in a distributed multi-band wireless networking system, comprising:
a plurality of wireless networking devices wirelessly interconnected via a wireless channel which is dedicated for communications between said wireless networking devices;
said interconnected wireless networking devices comprising a single, multi-band wireless network providing broad coverage to said client devices; and
said multi-band wireless network comprising at least one processor that dynamically optimizes wireless connections to the client devices by comparing signals received from said client devices at said wireless networking devices and that makes decisions at said wireless networking devices to switch a client from one wireless networking device to another wireless networking device;
wherein said decision to switch said client is made by said multi-band wireless network independently of said client; AND
further comprising said process programmed to execute steps in which:
said multi-band wireless network performs monitor mode on different channels;
said multi-band wireless network coordinates a channel switch via said wireless channel which is dedicated for communications between said wireless networking devices;
said multi-band wireless network requests a non-serving wireless network device operating on a first channel to move to a serving wireless network device operating on a second channel;
said non-serving wireless network device makes a measurement on said second channel;
said non-serving wireless network device returns to said first channel;
said non-serving wireless network device sends said measurement back to said serving wireless network device via said wireless channel which is dedicated for communications between said wireless networking devices;
said serving wireless network device sends a control packet on said second channel indicating that it is offline for a predetermined interval;
said multi-band wireless network measures an uplink RSSI with at least two wireless network devices;
said multi-band wireless network compares said measured RSSI between at least two wireless network devices on different channels; and
said multi-band wireless network makes a client roaming decision.

* * * * *